XP 3,638,123

[redacted]

X5272E T331-78 X5088E X5220E

[15] 3,638,123

[45] Jan. 25, 1972

[54] VLF ATMOSP. SYNTHESIZER

[72] Inventors: L. John Sicard, Uncasville; Christopher G. Foster, Gales Ferry, both of Conn.

[73] Assignee: The United States of America as represented by the Secretary of the Navy

[22] Filed: Dec. 1, 1969

[21] Appl. No.: 880,456

[52] U.S. Cl. ....................325/132, 331/78

[51] Int. Cl. ....................H03b 29/00

[58] Field of Search ....................331/78; 325/132

[56] References Cited

UNITED STATES PATENTS

| | | | |
|---|---|---|---|
| 2,974,198 | 3/1961 | McLeod | 331/78 X |
| | | | 331/78 X |
| 3,304,515 | 2/1967 | Stieler | 331/78 |
| 3,456,208 | 7/1969 | Ratz | 331/78 |

*Primary Examiner*—Richard A. Farley

*Assistant Examiner*—H. A. Birmiel

*Attorney*—Richard S. Sciascia, Louis B. Applebaum and Ernest F. Weinberger

[57] ABSTRACT

The output of a random noise generator is applied to a negative image clipper whose clipped output is simultaneously applied to at least three separate channels, each channel having in tandem arrangement a variable threshold clipper, a wideband amplifier, a variable high-gain amplifier, and an impedance matching network. The outputs of the matching networks are combined to provide selective atmospheric noise.

4 Claims, 4 Drawing Figures

INVENTORS.
L. JOHN SICARD
CHRISTOPHER G. FOSTER
BY Ernest J. Weinberger
Louis B. Applebaum
ATTORNEYS INVENTORS.
L. JOHN SICARD
CHRISTOPHER G. FOSTER
BY Ernest J. Weinberger
Loren B. [signature]
ATTORNEYS INVENTORS.
L. JOHN SICARD
CHRISTOPHER G. FOSTER
BY Ernest S Weinberger
Lou B. [signature]
ATTORNEYS

INVENTORS.
L. JOHN SICARD
CHRISTOPHER G. FOSTER
BY
ATTORNEYS

VLF ATMOSPHERIC NOISE SYNTHESIZER

The invention described herein may be manufactured and used by or for the Government of the United States of America for governmental purposes without the payment of any royalties thereon or therefor.

BACKGROUND OF THE INVENTION

1. Field of the Invention

The present invention relates to the generation of noise or interference signals, and more particularly pertains to synthesis of VLF atmospheric noise wherein the noise is generated in a controlled manner so as to reproduce specific atmospheric radio noise characteristics and provide accurate repeatability.

2. Description of the Prior Art

In the field of the generation of atmospheric radio interference, it has been the general practice to make recordings of actual atmospheric interference and playback that portion which was necessary for the required simulation. The inability to simulate a large number of noise characteristics while maintaining stability and repeatability and the introduction of skewing has accounted for the unsatisfactory output of prior art devices.

SUMMARY OF THE INVENTION

The general purpose of this invention is to provide a VLF atmospheric noise synthesizer that has all the advantages of similarly employed prior art devices and has none of the above-described disadvantages. To attain this, the present invention provides a unique arrangement of a plurality of separate channels fed from a common random noise generator and image clipper. Each channel permits initial variable clipping and variable high gain and impedance matching whereby the outputs of the channels can be combined to provide selective atmospheric noise while retaining stability and repeatability of any particular amplitude-probability-distribution (APD).

An object of the present invention is to provide a simple, inexpensive, reliable and direct VLF atmospheric noise simulator.

Another object of the invention is to provide a noise simulator which is portable and may be used in the field of evaluate VLF equipment by relatively unskilled personnel.

Other objects and many of the attendant advantages of this invention will be readily appreciated as the same becomes better understood by reference to the following detailed description when considered in connection with the accompanying drawings.

DESCRIPTION OF THE PREFERRED EMBODIMENT

The performance of a communications system can be described by two factors: the grade of service it provides and the percent time that this service is achieved or exceeded. The performance factor for the VLF communications system can best be identified by a character error rate (CER) determination, that is, the probability that a transmitted message of given length will contain a specific number of errors.

To evaluate the performance factor, the CER dependency on the system characteristics such as type of modulation, bandwidth, data rate, and system noise, must be accurately determined. Correlation of this data with the atmospheric noise present over a particular link produces a system performance factor.

Establishing this system performance factor for VLF communications necessitates that efforts in three major areas be pursued: (1) simulation of atmospheric noise samples, (2) characterization of these samples and (3) determination of the performance of the VLF receiver system.

So far, we have dealt with the average power as represented by $F_a$. While average power is a valuable parameter to use in determining the required signal-to-noise ratio for many types of communication circuits, other parameters give better correlation with character error rate or message errors in some systems. For example, in determining the reliability of a radioteletype system, it is useful to have some knowledge, of the amplitude-probability-distribution (APD) of the noise. This shows the percentage time (time of occupation) for which any level is exceeded; usually it is the noise envelope which is so described. The APD is dependent upon the short term characteristics of the noise, and, therefore, cannot be deduced from the hourly values of average power ($F_a$).

Figure 1A:
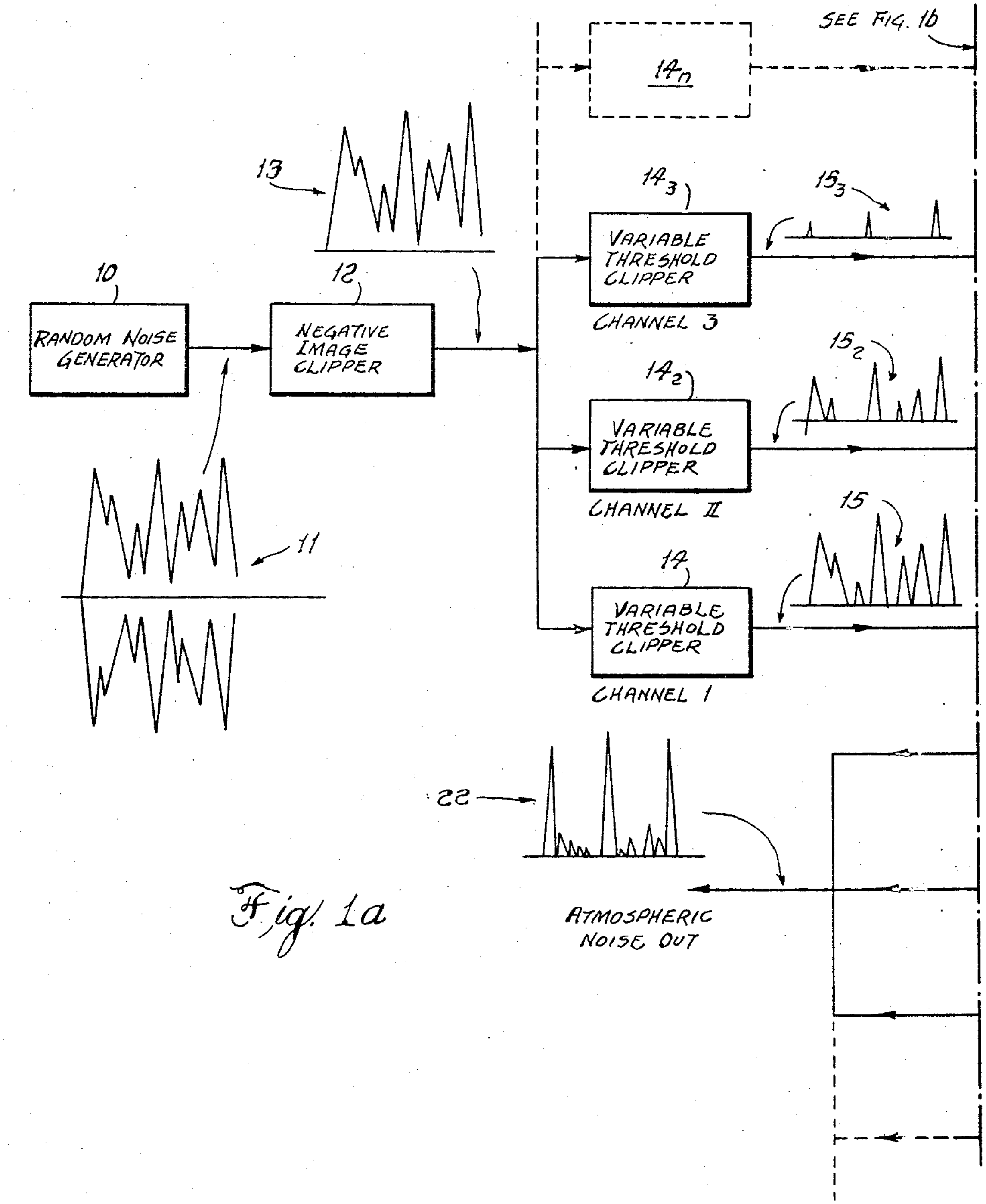
FIG. 1*a* and FIG. 1*b* show a block diagram of an embodiment made in accordance with the principle of this invention; and, FIG. 2*a* and FIG. 2*b* show a schematic wiring diagram indicating in detail the components comprising the block representations of FIG. 1*a* and 1*b*.
Figure 1B:
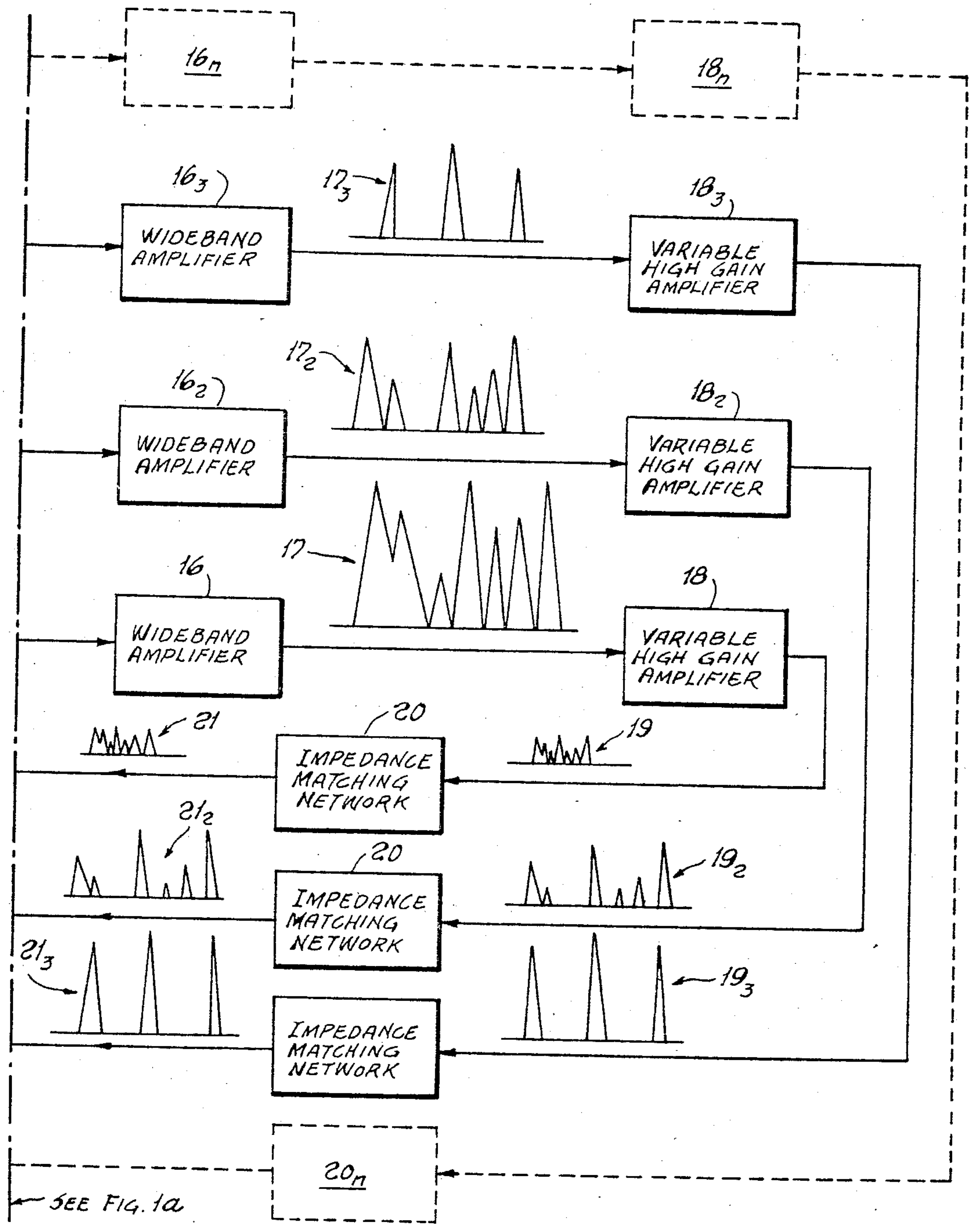

In the block representation of the embodiment illustrated in FIGS. 1*a* and 1*b*, a source of random noise 10 which may be a noise generator such as commercially available General Radio Generator Model 1390–B provides a noise distribution signal of a shape as represented at 11. This serves as a Gaussian noise input to image clipper 12 wherein the negative portion of the input noise is removed with a resultant output noise signal as at 13. The clipped noise is then simultaneously applied to the inputs of a plurality of similar channels, each of whose inputs comprise a variable threshold clipper 14. The channel clippers 14 are all set to different levels so as to provide representative signals as at 15, which are then processed by wideband amplifier 16, whose output 17 is in turn applied to variable high-gain amplifier 18. Its signal 19 is then fed into impedance matching network 20, whose outputs 21 are combined to provide a variable ($V_d$) VLF atmospheric noise signal 22.

Figure 2A:
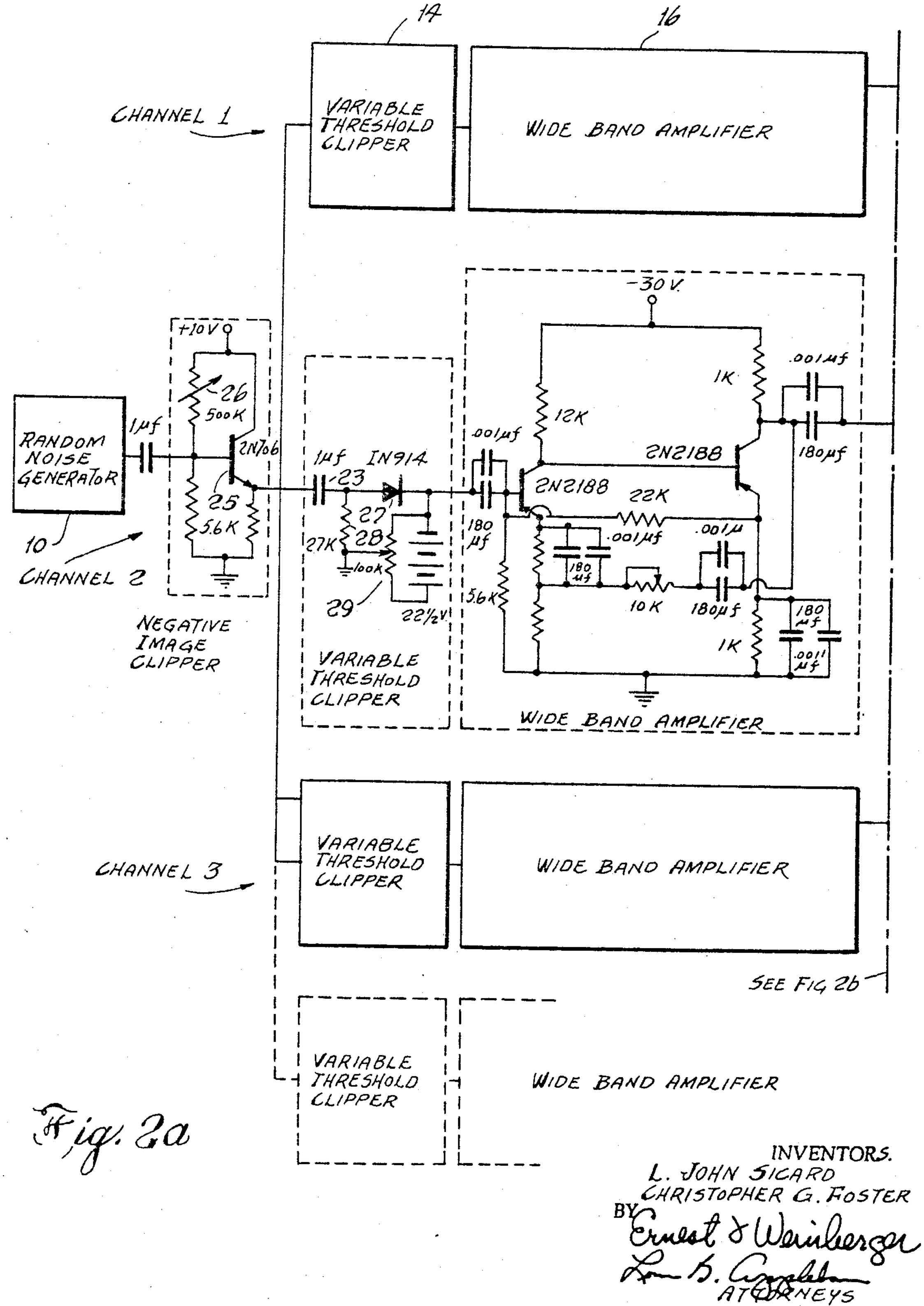
Figure 2B:
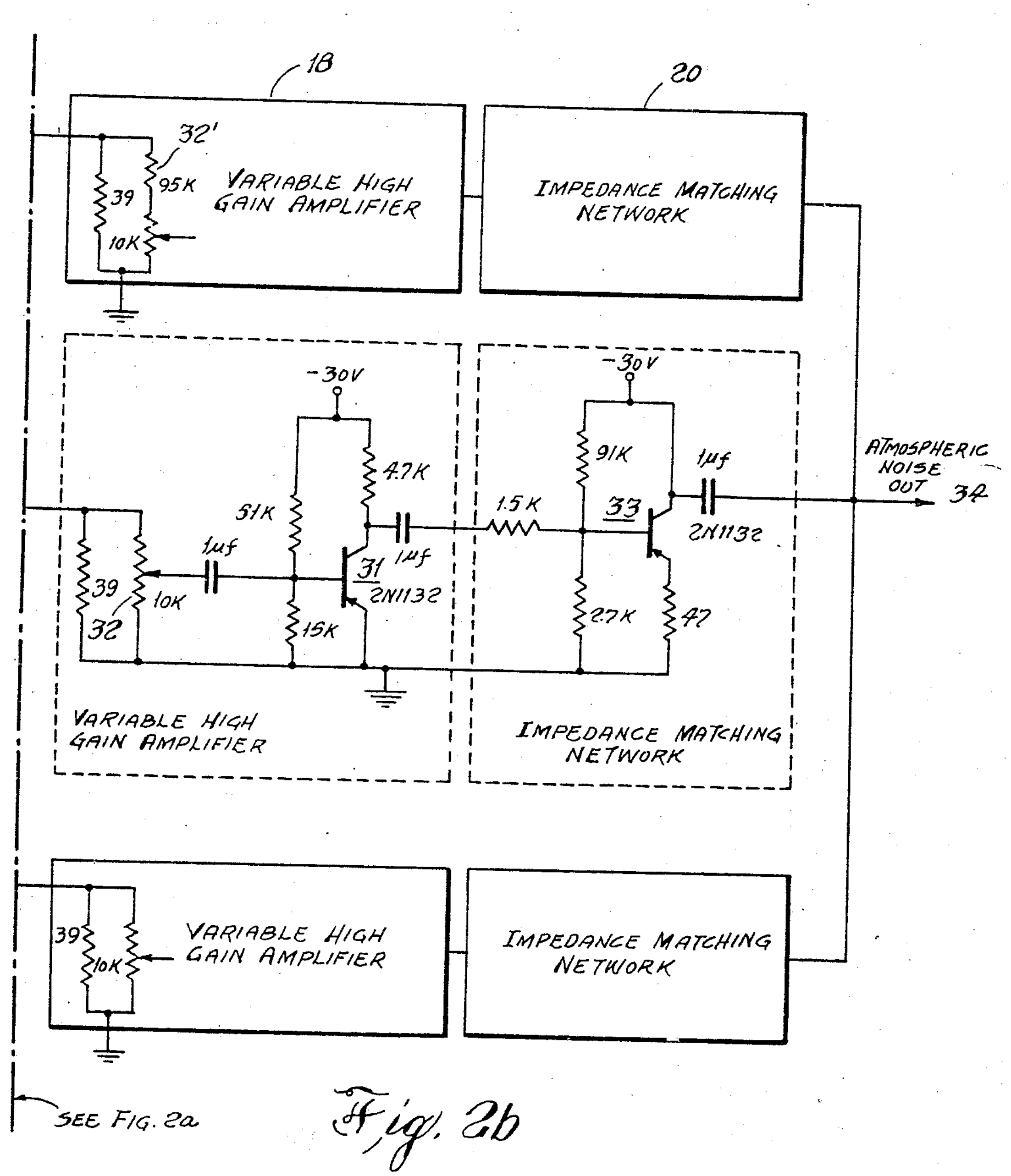

FIGS. 2*a* and 2*b* illustrate in detail a typical channel of the noise synthesizer where the random noise generator 10 provides a Gaussian noise distribution input to the image clipper 14. The clipper stage is a variable cutoff emitter follower. The purpose of the stage is twofold.

First, the emitter follower configuration provides a high-input impedance so that random noise sources of varying output impedances may be accommodated. (The nominal output impedance is 1,500 ohms; consequently, serious loading of the random noise source will not occur unless its output impedance exceeds this value). Second, the biasing of the 2N706M transistor 25 is adjustable by potentiometer 26, so that only the desired portion of the input will pass. In normal operation, the bias is adjusted so that the cutoff point of the transistor corresponds to the zero voltage point of the incoming Gaussian noise. The negative half of the input noise being a mirror image of the positive half, it presents no additional information and may be discarded without degrading the accuracy of the noise simulation. The output Gaussian noise spectra is in a form suitable for quantization.

The clipped output is fed through capacitor 23 into the variable threshold clipper/detector 14.

In order to obtain spectra which can be combined to form atmospheric noise, an accurate quantization of the input waveform must be made. To accomplish this quantization, three distinct levels were judged necessary. Less than this number would not have allowed for the extensive range required for true noise reproduction and a greater number of levels would have given finer resolution.

The diode threshold detector uses a diode 27 whose switching time is 4 nsec., which is adequate for the input pulses which range up to 33 μsec. in speed. The capacitor coupled input eliminates unwanted direct current which would adversely affect the triggering level of the detector. The resistive components consist of a 27 kohm fixed resistor 28 and a 100 kohm potentiometer 29.

The resistor 28 provides a direct current path for the battery so as to enable the biasing of the diode 27. The potentiometer 29 allows the level of biasing to be adjusted to give the desired spectra needed for true noise reproduction. A separate battery or supply is required for each detector to prevent the mixing of the noise which would occur with a single supply, since the output would also be the common negative terminal.

In addition, the separate supplies allow the attainment of a greater range of levels, thereby making the simulator compatible with varied random noise sources.

The current drain on each battery is such that normal usage will allow many months of operation, in the event a replacement is not available, the level can be adjusted by a new setting on the potentiometer 29. This feature is especially desirable in equipment which will be used in field evaluations where replacements can sometimes be troublesome.

After the formation of the three atmospheric components in the detector/clipping stage 14, each is fed to a wideband amplifier 16. The wide range of frequencies present in the incoming waveform requires a bandwidth extending above that of the input Gaussian noise spectrum. The clipping of the input noise pulses shortens their base line duration, thereby increasing their frequency content. The amplifier used, with 10 MHz. bandwidth, meets this requirement amply.

Both series and shunt feedback are used to stabilize the gain and make it nearly independent of supply voltage and temperature variations. The transistors used are germanium PNP-types. Although this type is more sensitive to temperature variation than silicon types, the multiple function feedback characteristic compensates for any parameter changes.

The amplitude level of the waveform present at the amplifier 18 output is such that combining the three levels at this point would not give the necessary dynamic range for true noise simulation.

The 80 db. dynamic range required is obtained by using a PNP-silicon transistor 31 in a grounded emitter configuration.

The choice of a silicon transistor was due to the relative temperature stability of a silicon transistor over that of a germanium type. The desire for high gain led to the grounded emitter configuration which allows ranges of 80 db. to be realized. The potentiometer 32 at the input allows the gain of the amplifier to be varied so as to accommodate the desired noise spectra. Since one of the channels (I) necessitates only limited amplification the variation required can be better controlled by the addition of another fixed resistor 32' in series with the potentiometer 32.

This variable gain technique is used in place of a proportional resistor summing network.

The normal resistive summing network has a fixed number of settings which can be combined to give a desired range. Using the variable gain technique, there are theoretically an infinite number of combinations which are possible, and in practice this flexibility allows the noise source to simulate any real world condition in as fine a gradation as is practically possible.

The voltage output of the variable high gain amplifier has the required range for accurate noise reproduction. However, it does not contain the necessary current to drive either test equipment or the communication system under test. In an effort to make the system compatible with not only the laboratory designed measuring equipment but also with any communications system which requires evaluation, a standard 50 ohm output is desirable.

The use of a capacitor coupled grounded collector circuit 33 configuration has provided the necessary high input resistance to low output resistance matching requirements while maintaining the required voltage amplitude and simultaneously increasing the current output. The summed spectra from these impedance matching networks is the output at 34 and is a synthesized source of VLF atmospheric noise.

We claim:

1. An atmospheric noise synthesizer comprising
   a random noise generator;
   an image clipper connected to receive the output of said noise generator;
   a plurality of separate channels each having connected in series therein
   a variable level clipper,
   a wideband amplifier,
   a variable high-gain amplifier, and
   an impedance matching network;
   first electrical means simultaneously connecting the output of said image clipper to each of said channels; and
   second electrical means simultaneously connecting the outputs of said matching networks to each other to provide a common output of atmospheric noise.
2. The synthesizer according to claim 1 wherein said random noise generator provides a Gaussian noise distribution.
3. The synthesizer according to claim 2 wherein the number of said channels is at least three.
4. The synthesizer according to claim 3 wherein said matching network provides a 50 ohm output impedance.

* * * * *